Patented Apr. 24, 1934

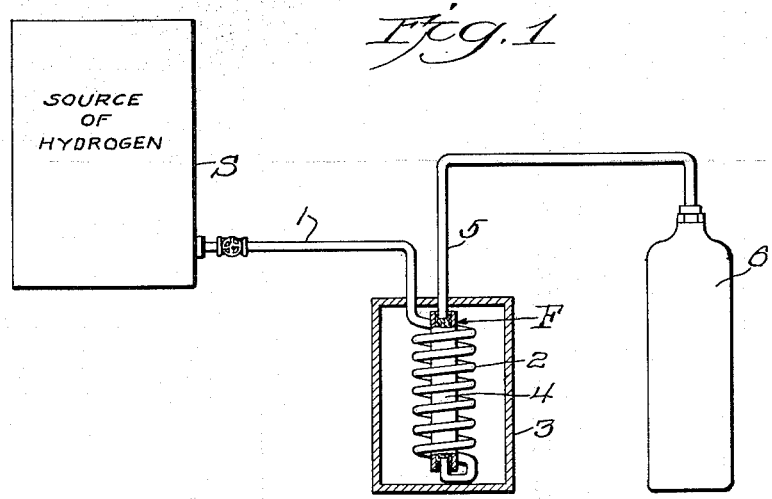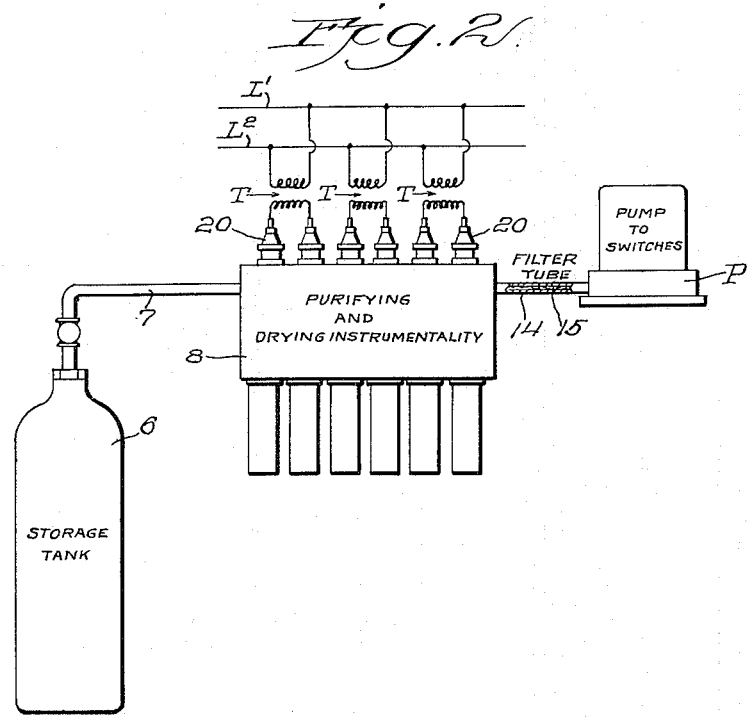

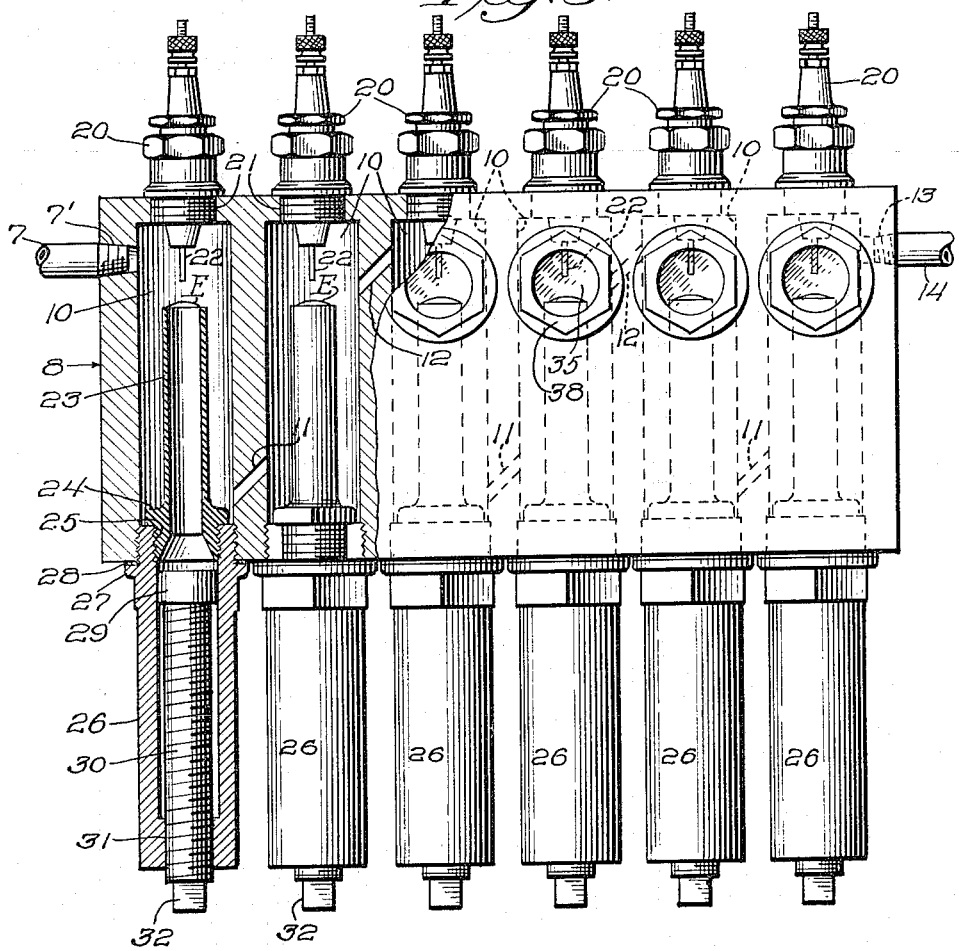
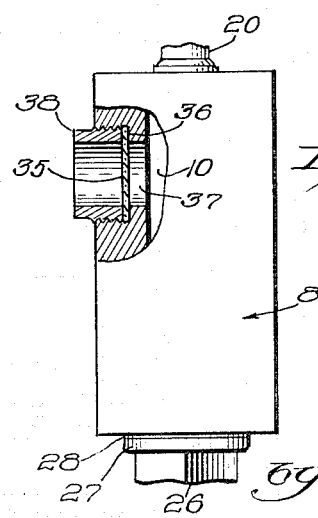

1,955,780

UNITED STATES PATENT OFFICE 1,955,780

PROCESS AND APPARATUS FOR PRODUCING PURE HYDROGEN

Carl J. Warnke, Elkhart, Ind., assignor, by direct and mesne assignments, to The Adams & Westlake Company, Chicago, Ill., a corporation of Illinois Application April 27, 1931, Serial No. 533,229

10 Claims. (Cl. 23—210)

My invention relates to a process of and apparatus for producing extremely dry and substantially chemically pure hydrogen which is especially adapted for use as the inert, arc suppressing atmosphere in a mercury switch although also adapted for advantageous use wherever dry and substantially pure hydrogen is desirable.

One widely used type of mercury switch comprises generally an evacuated hermetically sealed container, electrodes sealed through the wall of the container, a body of mercury cooperable with the electrodes and an inert arc suppressing atmosphere of hydrogen. One form of such a mercury switch is shown and described in Patent No. 1,598,874, granted September 7, 1926 to L. A. M. Phelan. It is well known that this type of mercury switch, even where the structural integrity of its elements is preserved, will fail after being flashed or operated a certain number of times, due to the mercury separating and leaving a portion stringing or hanging between and short-circuiting the electrodes in the open position of the switch.

I have discovered that the primary cause of this failure is due to absorption by the mercury of impurities contained in the so-called commercially pure hydrogen and also present to some extent on the surfaces of and in the electrodes. The electrode impurities are in the form of an oxide coating or scale on the surfaces thereof and also in the form of absorbed or occluded gases in the body or mass of the electrodes. This source of contamination of the mercury I propose to reduce to a minimum by carefully preparing these electrodes and removing all oxide or scale therefrom and then protecting the electrodes from contamination during the process of manufacture of the switch. The impurities present in the hydrogen present a far more difficult problem, since these impurities have remained in the hydrogen notwithstanding the gas during its manufacture has been purified as far as known means permit. I have determined that the impurities present in the so-called commercially pure hydrogen gas consist of small amounts or traces of nitrogen, oxygen, moisture or water, hydrocarbons, due to absorption of small amounts of oil from the apparatus, and possibly other substances.

It is the primary object of my invention to provide a process of and an apparatus for purifying and drying commercial hydrogen so that the hydrogen, after having been subjected to the treatment proposed by my invention, will be substantially pure and substantially dry. Consequently, when used as the atmosphere in a mercury switch, it will prolong the life of the switch to a very material extent so that the switch will operate with efficiency a great many times more than a similar mercury switch containing an atmosphere of commercially pure hydrogen.

To determine the probable life of a mercury switch of any type and structure, it is customary to subject a number of the switches produced by the same manufacturing process and of the same materials to the so-called "flash test". The switches to be tested are selected at random so that they represent on the whole the average type of switch being manufactured. The flash test consists in incorporating such a mercury switch in an electrical circuit wherein it will be subjected to a known load and a known voltage and in operating the switch at a given speed until it fails. In this way, the number of times that the switch may be flashed or operated is accurately determined and this affords a reliable indication of the probable life of average switches of the same type and structure. When mercury switches containing an atmophere of the so-called pure hydrogen, available prior to my invention, were subjected to the flash test, the life of such switches varied between one thousand and two thousand flashes, whereas with the same type and structure of switch containing an atmosphere of the substantially pure and dry hydrogen produced by my process, the life of the switches was prolonged to between twenty-five hundred and four thousand flashes.

I believe that these advantages result from a substantial purification and extreme drying of the hydrogen and that, as a consequence, the hydrogen does not carry any impurities or moisture to be absorbed by and contaminate the mercury. On the contrary, the hydrogen gas produced by the present invention will have the capacity of absorbing some of the impurities that may remain, notwithstanding careful manufacturing, on or in the electrodes, and on the walls of the evacuated vessel, and will preclude the absorption of such impurities by the mercury over a long period of time.

Broadly, my process consists in subjecting hydrogen, which previously has been freed as fas as possible of its impurities, to the action of a vaporized substance having high absorptive properties in an hermetically sealed chamber. Preferably, the vaporized substance is ionized in order to accelerate the action thereof and this, together with the high temperature of the environment of the vaporized substance and through which the hydrogen passes, enhances its action in converting the impurities of the hydrogen into precipitated solids or into water which is absorbed by the vaporized substance.

More particularly, my process consists in passing a stream of hydrogen through one or more hermetically sealed chambers in each of which it is subjected to the action of an electric arc having as its vaporized and ionized constituent sodium, potassium, or some equivalent substance which is hygroscopic and capable of aiding in the conversion of the impurities of the gas into precipitated solids, such as black phosphorus, titanium, and other materials having the indicated characteristics.

In carrying out the process of my invention, I first pass the commercially pure hydrogen through coils which are surrounded by liquid air so as to condense as far as possible all of the free moisture in the hydrogen and as many of the other impurities as will be removed from the gas by the extremely low temperatures afforded by the liquid air. After leaving the coils, the hydrogen is stored in holders or tanks from which it is passed, when it is to be used, through one or more and usually a series of arcs formed in a series of hermetically sealed and connected chambers and subjected to the high temperature of the arc and also to the action of the vaporized and ionized constituent of the arc, which constituent is of such character or has such properties as to be capable of absorbing or removing all remaining moisture in the gas and of converting the remaining impurities into solids which are precipitated from the gas in the form of fine powders. Usually the arc is formed between an electrode such as molybdenum or tungsten and an electrode of sodium, potassium, or other metal of the sodium group, or black phosphorus, titanium, and the like. The sodium, potassium, or the like, is selected because it is hygroscopic, and also because when vaporized and ionized it has the property of combining in the heat and environment of the arc with impurities in the hydrogen gas. It is believed to be important to so constitute the electrodes of the arc that the vaporized and ionized constituent of the latter will be hygroscopic for the reason that if the moisture of water is allowed to remain in the hydrogen it will, when in the mercury switch, act as a catalyst and accelerate those reactions that tend to contaminate the mercury. Further, the high temperature and environment of the arc or arcs induces a combination between the hydrogen and the oxygen to form water which is immediately absorbed by the vaporized sodium. In other words, the arc influences impurities to combine with each other and with the hydrogen and to form, either powdery solids which are precipitated, or water which is absorbed by the sodium.

After passing through the arcs, the gas is then drawn off through a long tube which is filled with cotton or other filtering medium acting merely to prevent the powdery solids from being entrained with the purified gas and carried into the switches. The tube is connected to the suction manifold of a pump of the type widely used for filling mercury switches with an inert, arc suppressing gas.

It is believed that the gas produced as a result of my process is highly purified and extremely dry hydrogen, as the spectrum of the gas contains only hydrogen lines. Further, all of the various chemical tests indicate the gas to consist only of hydrogen. For example, the highly purified and dry gas produced by my method has been passed through phenolphthalein without any indication of the presence of sodium. It has, however, some peculiar chemical and physical properties. When passed through carbon tetrachloride, a reaction ensues which results in the generation of hydrochloric acid and the production of carbon. This is rather remarkable and unexpected as the so-called pure hydrogen heretofore available will produce no reaction when passed through carbon tetrachloride. Another unexpected effect produced is that when a mercury tube containing my dry, pure hydrogen is agitated in the dark before it has been flashed, the dry, pure hydrogen becomes fluorescent, or gives off a blue glow. With ordinary hydrogen, there will not be any glow or fluorescence until after the mercury switch containing the same has been flashed a few times and further, after continual flashing with a switch having the ordinary commercial hydrogen, the fluorescence entirely disappears.

One form of apparatus for carrying out my method is shown in the accompanying drawings, in which:

Figure 1 is a diagrammatic view of an apparatus which may be employed for chilling the hydrogen;

Fig. 2 is a similar view of the apparatus employed for carrying out the drying and purifying process by subjecting the hydrogen to the action of an electric arc;

Fig. 3 is a view, partly in longitudinal vertical section and partly in side elevation, of the unit of the apparatus in which the arcs are formed; and Fig. 4 is a fragmentary view in end elevation of the structure shown in Fig. 3, a portion of the structure being broken away and shown in transverse vertical section for the sake of illustration.

Referring to the drawings, and more particularly to Fig. 1, any suitable source of commercially pure hydrogen is illustrated diagrammatically and designated generally at S. The source S connects by a valve controlled pipe line 1 with cooling coils 2 enclosed in an hermetically sealed casing 3 to which liquid air is supplied. The low temperature to which the hydrogen is subjected in the coils 2 freezes out the grosser quantities of the impurities that are susceptible of being frozen or solidified at such low temperatures and the impurities so frozen are taken up in a filter designated generally at F and shown as comprising a cylinder 4 connected in series with the coils 2 and with a pipe line 5 extending to a conventional storage tank or holder 6. The cylinder 4 is filled with a suitable filtering medium such as cotton. It is to be understood that the entire system shown in Figure 1 is hermetically sealed and that any suitable means is employed for forcing the hydrogen through the system and causing it to be stored under pressure in tank 6.

When the hydrogen is to be used, as for example, a gas fill for mercury switches, it is taken from a storage tank 6 and passed through an instrumentality or unit 8 in which the purifying and drying process is carried out. Of course, at such time the tank 6 is disconnected from the pipe line 5 and connected to the instrumentality 8 by a valve controlled pipe line 7 (see Fig. 2). The tank 6 may have the conventional head which is equipped with suitable valve and couplings or connections.

The instrumentality 8 is shown to advantage in Figs. 3 and 4 and may consist of a block of metal, such as steel, which is formed with a plurality of vertical chambers 10 spaced along the block. The chamber 10 at one end of the block has its upper portion connected with the pipe line 7, as indicated at 7'; and this same chamber 10 is connected adjacent its lower end with the lower end of the next adjacent chamber 10 by means of an inclined passage 11, while this last chamber 10 is connected adjacent its upper end with the next adjacent chamber 10 by an inclined passage 12. This same mode of connection is carried on throughout the block and finally the chamber 10 at the end of the block opposite the pipe line 7 connects at its upper end, as indicated at 13, with a pipe line or elongated tube 14, filled with cotton fibre or other filtering medium 15, and connecting with the suction line or suction manifold of a pump P of the type conventionally utilized for filling mercury switches with hydrogen.

With the chambers 10 connected as shown, the gas flows down through one chamber, up through the next, down through the next, up through the next, down through the next, and so on, pursuing a generally sinuous course in its passage through the block. In each of the chambers 10, the gas is subjected to the action of an arc established between a molybdenum or tungsten electrode on the one hand and an electrode composed of the materials heretofore described.

The molybdenum electrodes are preferably in the form of spark plugs 20 threaded into openings 21 provided in the upper side of the block each having a single molybdenum point 22 which extends axially down into its chamber 10 and terminates in spaced relation to the upper end of a tube 23. The lower end of each tube 23 is shouldered as at 24 and has a threaded end 25 engaged in the upper end of a cylinder 26 which is threaded into the lower end of the chamber 10. Each cylinder 26 also has an annular flange or shoulder 27 which clamps against a gasket 28 interposed between it and the bottom of the block. A follower 29 is fitted in each cylinder 26 and is carried on the upper end of screw or stem 30 threaded through an opening 31 in the lower end of the cylinder. The extreme lower end of each stem 30 is provided with a squared portion 32 adapted to cooperate with a wrench or other suitable tool.

Each tube 23 and cylinder 26 is filled with one of the substances indicated above to form an electrode E cooperable with the point or electrode 22. When sufficient electrical potential is impressed upon the electrodes, the sodium or the like is vaporized and ionized and an arc is established between the electrodes. As explained in the description of the method, sodium or other material used for electrode E absorbs water suspended in the hydrogen or formed in the arc and the remaining impurities are converted into powdery solids which fall down into the portions of the chambers 10 around the tubes 23. This action, of course, consumes some of the sodium, but the latter is replenished at the top of the tube 23 by the operator simply by turning the stem 30.

The attendant has a full view of the operation at all times by virtue of the provision of mica windows 35 in the block, these windows being clamped against seats 36 surrounding openings 37 by means of annular or open nuts 38 threaded into the block, as shown in Fig. 4.

The high electrical potential, required to obtain arcs effective for the purposes of the present invention, may be impressed across the electrodes in a variety of ways. One convenient manner of accomplishing this result is shown in Fig. 2, which illustrates the plugs 20 arranged in pairs, with the members of each pair connected in series across the secondary terminals of a step-up transformer T energized from power lines L', L². It will be understood, of course, that the spark plugs 20, and consequently points or electrodes 22, are connected by conductors to the secondary terminals of their transformer T and that the metal of the block or body of instrumentality 8 affords a ground or electrical connection between the electrodes E. To obtain best results, the currents utilized must at least be sufficient to vaporize and ionize the sodium or other material employed for the electrodes E. Preferably a 12,000 volt potential is applied across the electrodes and the latter are adjusted so that the current consumption is about 200 milliamperes.

The chambers 10, as well as the entire system through which the hydrogen passes during the purification process, are hermetically sealed, all joints and connection being constructed or packed to obtain the desirable hermetic sealing.

I claim:

1. The process of purifying and drying hydrogen which consists in passing the same through vaporized sodium in the presence of an electric arc.

2. The process of drying and purifying commercial hydrogen which consists in chilling the hydrogen to remove moisture and impurities that will freeze out of the same at low temperature and then passing the gas through a vaporized metal of the sodium group in the presence of an electric arc.

3. The process of purifying and drying hydrogen which consists in passing the same through an electric arc having a vaporized constituent which is hygroscopic.

4. The process of purifying hydrogen which consists in confining the same and while confined subjecting the hydrogen to the action of a vaporized substance having high absorptive properties in the presence of an electric arc thereby extracting all moisture from the hydrogen and converting other impurities thereof into powdery solids.

5. The process of purifying hydrogen which consists in confining the same and while confined subjecting a stream of hydrogen to the action of a vaporized substance having hygroscopic properties and to the action of high temperature.

6. The process of purifying and drying hydrogen which consists in confining the same and while confined subjecting the hydrogen to the action of an electric arc having as its vaporized constituent a substance which has hygroscopic properties.

7. A process of purifying hydrogen which consists in passing the same through an ionized atmosphere formed substantially by the dissociation of a metal of the sodium group from a solid to a vapor state.

8. A process of purifying hydrogen which consists in passing the same through an ionized vapor path created by the dissociation of a metal of the sodium group from a solid to a vapor state, and to the action of high temperature.

9. A process of purifying hydrogen which consists in subjecting the same to the action of an electric arc, one of whose electrodes is composed of a metal of the sodium group.

10. An apparatus for purifying and drying hydrogen including a chamber hermetically sealed against the atmosphere, means for causing the hydrogen to pass through the chamber, and means for establishing an electric arc in the chamber which has as its vaporized constituent a substance having high absorptive properties whereby to extract all moisture from the hydrogen and to convert other impurities thereof into precipitated solids.

CARL J. WARNKE.